(12) United States Patent
Sowers et al.

(10) Patent No.: US 6,259,364 B1
(45) Date of Patent: Jul. 10, 2001

(54) HORN SWITCH AND ANCILLARY DEVICE SWITCHES FOR VEHICLES

(75) Inventors: James Price Sowers, Lakeland; Tex K. Monroe, Deltona, both of FL (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/465,094

(22) Filed: Dec. 16, 1999

(51) Int. Cl.$^7$ .................................................. G08B 13/18
(52) U.S. Cl. ........................ 340/555; 340/438; 340/552; 250/229
(58) Field of Search ...................... 340/438, 540, 340/545.3, 552, 555, 556, 557; 200/61.54, 61.55, 61.02; 280/728.3, 731, 735; 307/10.1, 10.2; 250/227.28, 551, 221, 222.1, 229

(56) References Cited

U.S. PATENT DOCUMENTS

| | | | |
|---|---|---|---|
| 4,023,887 | * 5/1977 | Speers | 250/227 |
| 4,456,903 | * 6/1984 | Kishi et al. | 307/10.1 |
| 4,672,214 | 6/1987 | Takahashi et al. | 250/551 |
| 4,707,057 | 11/1987 | Takahashi et al. | 385/19 |
| 4,830,461 | 5/1989 | Ishiharada et al. | 485/13 |
| 5,423,569 | 6/1995 | Reighard et al. | 280/731 |
| 5,698,828 | 12/1997 | Perkins | 200/61.54 |
| 5,743,555 | 4/1998 | Durrani | 280/731 |
| 5,934,702 | 8/1999 | Coleman | 280/731 |
| 6,040,532 | 3/2000 | Munch | 177/144 |

FOREIGN PATENT DOCUMENTS

| | | |
|---|---|---|
| WO 9427301 | 11/1994 | (WO). |
| WO 9805543 | 2/1998 | (WO). |

* cited by examiner

Primary Examiner—Van T. Trieu
(74) Attorney, Agent, or Firm—Lonnie Drayer; Patrick Stiennon

(57) ABSTRACT

A horn or other vehicle device can be activated or controlled by attenuating light. A horn switch, or an optical switch, has a light source, light detector, and a pathway for light extending through a void. The switches are activated by attenuating the light emitted by the light source. The light can be attenuated by at least partially obstructing the light or by modifying the orientation of either the light detector or the light source.

14 Claims, 4 Drawing Sheets

HORN SWITCH AND ANCILLARY DEVICE SWITCHES FOR VEHICLES

FIELD OF THE INVENTION

This invention relates to a horn switch or a switch for an ancillary device in a vehicle.

BACKGROUND OF THE INVENTION

Before the advent of airbag systems, the horn switch was typically mounted on the hub of the steering wheel. The mounting or installation of the horn switch was straightforward and vehicle operator grew accustomed to the location of the horn switch.

With the advent of airbag systems, the use of a hub mounted horn switch has become cumbersome. The difficulty in mounting the horn switch stems from the insertion of an airbag module beneath the cover of the steering wheel hub as well as the conversion of the cover of the steering wheel hub into a deployment door.

To overcome the expense and challenge of mounting a horn switch on the center of the steering wheel, the industry has developed different locations for mounting the horn switch along with different operating mechanisms of the horn switch. One approach has been to have the whole airbag module move to close a switch. This approach has led to very complex steering wheel/airbag design and manufacturing. Another approach to the problem is the utilization of membrane switches that reduce the problems associated with moving the whole airbag module to close a switch; however, these switches have temperature and humidity limitations. Another approach is the relocation of the horn switch to the spokes of the steering wheel. The downside of this approach is that this placement provides a source of inconvenience for the vehicle operator.

DISCUSSION OF THE PRIOR ART

U.S. Pat. No. 5,698,828 teaches a horn switch having specially designed optically conductive material capable of detecting deformation of its medium. The drawbacks to this horn switch are the undue hardship required in molding the steering wheel was well as the possibility of the conductive material becoming a projectile during deployment of the airbag. This patent requires the use of the optically conductive material for the functioning of the horn switch but does not teach or suggest a design for this invention that does not employ special optically conductive material.

SUMMARY OF THE INVENTION

There is provided in accordance with one aspect of the invention an inexpensive horn switch that can be mounted underneath the airbag cover. There has been a long felt need for a practical, low cost horn switch for use with an airbag equipped steering wheel. The present invention is beautiful in its simplicity and its low cost. The horn switch comprises a light source which generates a light signal and a light detector which measures the intensity of the light signal. The horn switch is activated by either partially obstructing the light signal or by altering the orientation or alignment of the light source or light detector.

There is provided in accordance with another aspect of the invention optical switches for controlling various vehicle devices. The electronic components of these optical switches can be identical to the disclosed horn switches. The optical switches can be mounted on the airbag cover as well as on the spokes or rim of the steering wheel or any other suitable vehicle component.

DETAILED DESCRIPTION OF THE INVENTION

Figure 1:
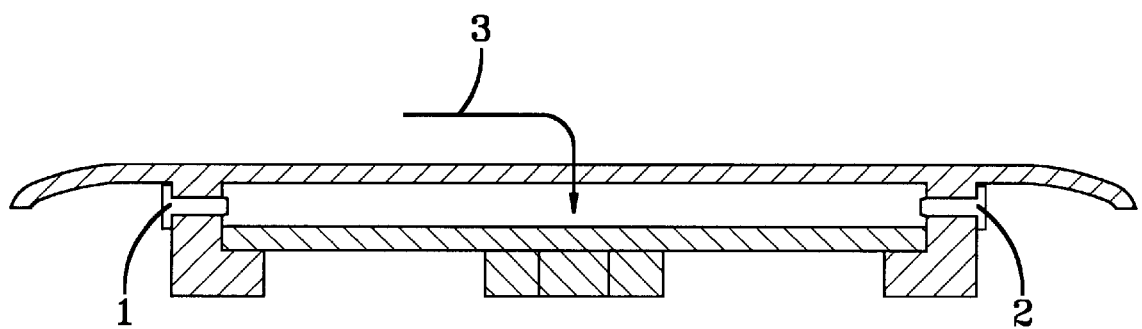
FIG. 1 is an exemplary view of a horn switch where the light signal is attenuated by obstructing the light signal.

The horn switch comprises a light source 1, a light detector 2, and a pathway 3 for the light extending through a void. The intensity of the light is attenuated by a means for reducing the light signal intensity and sufficient attenuation of the light signal will activate a vehicle's horn. FIG. 1 is an illustration of the invention having a light source 1, a light detector 2, and a pathway 3 that is a void or cavity for the light signal. As used herein and in the claims, the term "void" is understood to have its common meaning of an empty space. Ambient light from the vehicle passenger compartment is prevented from entering the void. In FIG. 1, the light signal is attenuated or reduced by obstructing the light signal in the cavity. Applying a deforming force to the airbag cover 21 will result in the airbag cover directly blocking some or all of the light in the horn switch. The airbag cover is comprised of a flexible material able to return to its "rest position" once the deforming force is removed from the airbag cover.

Figure 2:
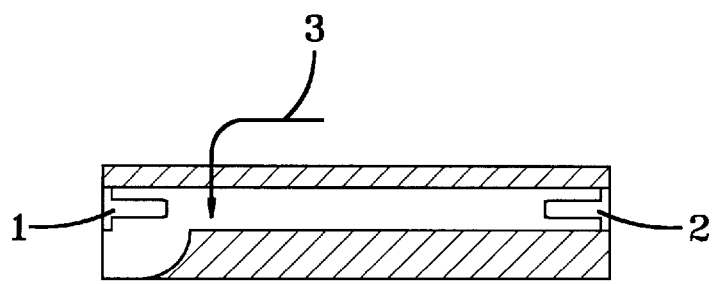
FIG. 2 is an exemplary view of a horn switch where the light signal is attenuated by altering the orientation of the light source or the light detector.

FIG. 2 illustrates another means for attenuating the intensity of the light signal. The intensity of light signal is reduced by applying a force that modifys the orientation of the light source 1. The light source will no longer be directly aligned with the light detector and hence the measured signal intensity will be lower. Another means for attenuating the light signal intensity is by altering the orientation of the light detector 2.

Figure 3:
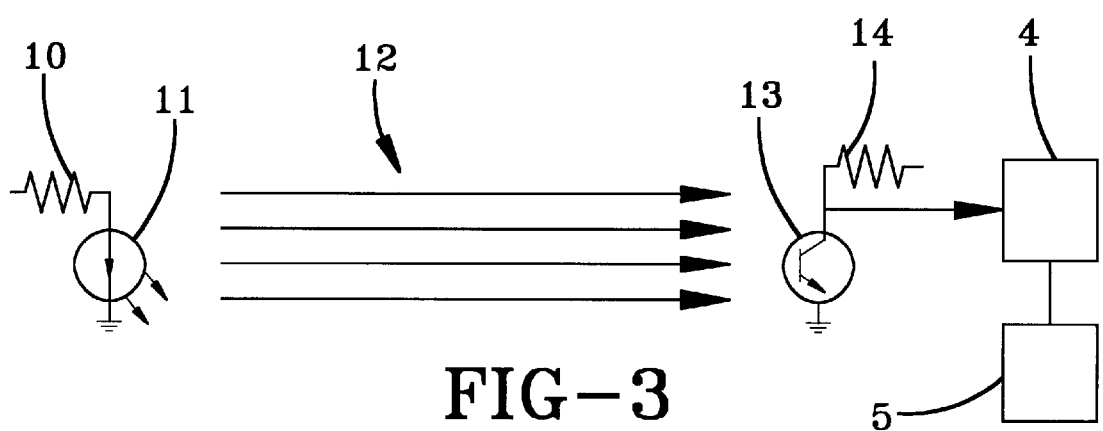
FIG. 3 is a pictorial diagram of the components for the horn switch.

A prototype for the invention has been constructed as shown in FIG. 3. The light signal 12 is generated by a light emitting diode 11 with a resistor 10 (180–700 ohms) which provides control of the light output along with the current limit. The light signal 12 travels through the void to a phototransistor 16, which is the light detector. The resistance 14 of the phototransistor circuit controls the light sensitivity and limits the current. The electrical signal from the phototransistor is transmitted to a controller 4 and processed to determine whether the incoming signal warrants activation of the horn 5. From conducting experiments with the prototype, it was demonstrated that the invention was able to function over the temperature range of −40° C. to +85° C. with a threshold set at 2.5V for an infrared LED and phototransistor, both purchased from Radio Shack. Experiments were conducted with a red LED in lieu of an infrared LED and the invention still properly functioned through the temperature range.

Figure 4:
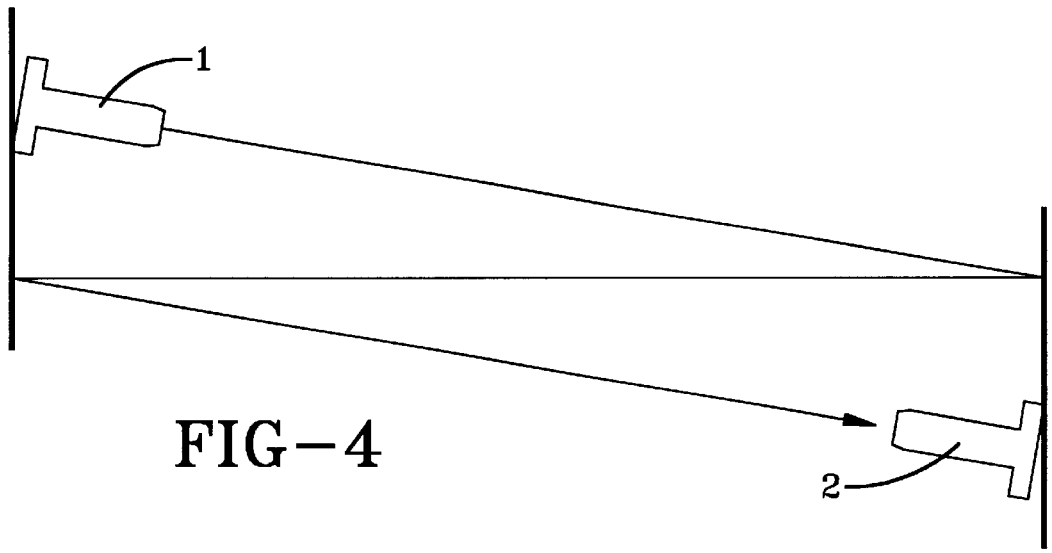
FIG. 4 is a pictorial diagram of a horn switch where the light signal reflects off of two surfaces before reaching the light detector.
Figure 5:
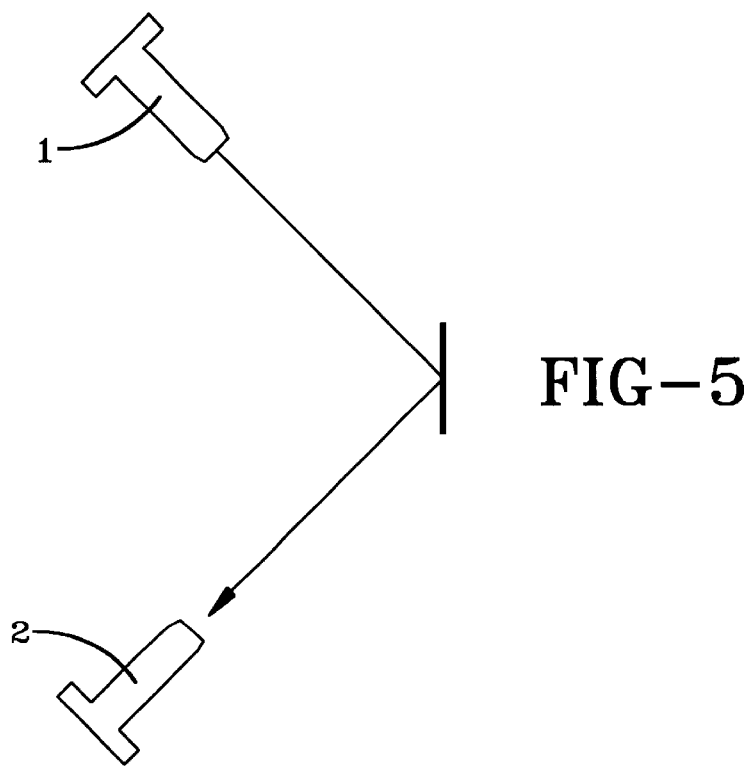
FIG. 5 is a pictorial diagram of a horn switch where the light signal reflects off of one surface before reaching the light detector.

While the prototype disclosed herein was reduced to practice having the light signal going in a direct path to the light detector from the light source, it is understood that any path for the light signal may be used in the practice of this invention. FIGS. 4 and 5 provide two embodiments of the invention where the light signal does not travel in a straight path from the light source to the light detector. In FIG. 4, the light signal is reflected off of two surfaces before reaching the light detector while the light signal in FIG. 6 is reflected off of one surface.

Figure 6:
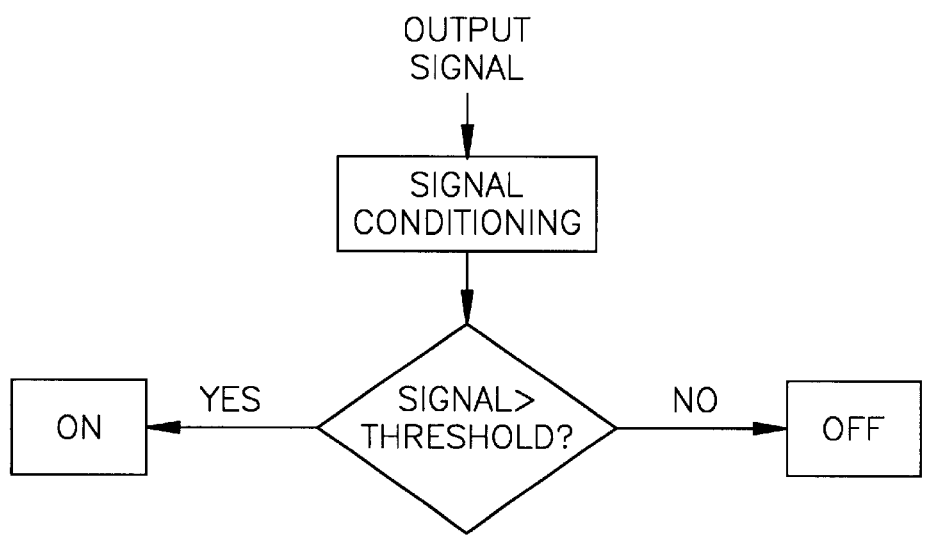
FIG. 6 is a flow chart showing the decision flow for detecting when a switch is activated.

The flow chart in FIG. 6 shows that the quantity of light received by the detector will dictate which of the two possible outcomes occur. The output signal from the phototransistor 16 is analyzed by the controller, or in other words the incoming signal is conditioned. The controller compares the signal to established signal thresholds and a measured signal strength greater than the established threshold will yield activation of the horn, and conversely a measured signal strength less than the established threshold will not yield activation of the horn. The level of sophistication of the controller may be selected in accordance with the desires of an engineer or vehicle manufacturer. For example, the controller may be a simple reed switch activated when a selected current or voltage signal is transmitted thereto by the light detector. The change in voltage can alternatively be measured by an A/D converter, voltage comparator, or other detection circuitry.

Figure 7:
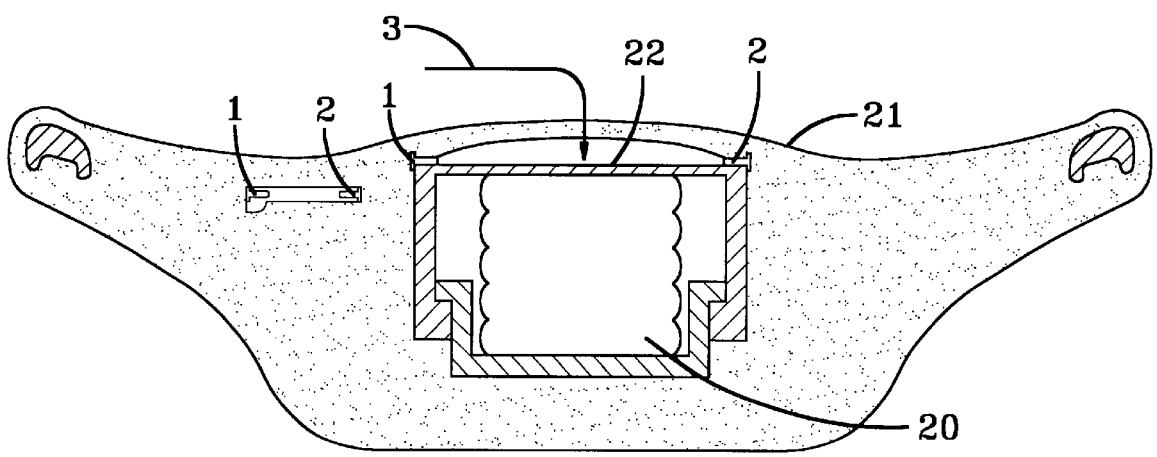
FIG. 7 is a cross sectional view of a steering wheel depicting a horn switch and an optical switch. The void for transmitting the light signal for the horn switch is formed by the airbag cover and the airbag module.
Figure 8:
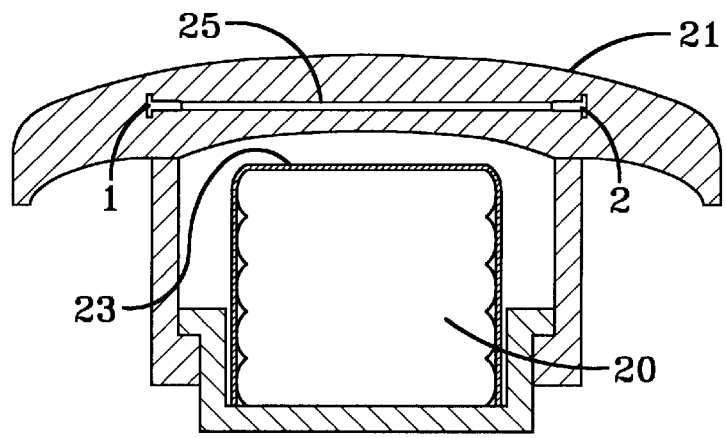
FIG. 8 is a cross sectional view of a steering wheel with a void space for the light signal formed by molding a steering wheel.
Figure 9:
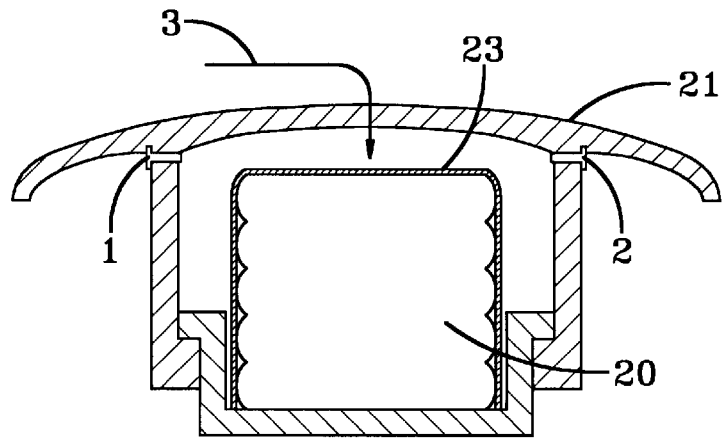
FIG. 9 is a cross sectional view of a steering wheel with a void space for the light signal formed by the airbag cover and a sleeve enclosing the airbag module.

There are various ways of creating a pathway for the light signal pursuant to the invention. A first method of creating a pathway is by the use of a hollow tube to guide the light. An additional method is by the establishment of a void 3 between an airbag cover 21 and an airbag module 20 (FIG. 7). Another approach is to create a pathway by molding the underneath portion of an airbag cover or more generally a cover on the hub of the steering wheel (FIG. 7). The molded airbag cover (25) will provide an empty space or void for the light to travel through. The empty space is separated from the airbag module 20 of the steering wheel. The void 3 can also be created by the empty space between an airbag cover and a retaining member, such as a thin sleeve 23 surrounding an airbag module 20 (FIG. 9). The sleeve ensures that the airbag module does not inadvertently enter the light path during normal operations. Specifically, it acts to hold the airbag during vibration or other motions encountered during normal driving conditions of a vehicle.

In addition to an optical horn switch in a steering wheel, optical ancillary switches 15 can also be placed on a steering wheel, instrument panel, armrest, or any other suitable location to control the operation of automotive electronic devices such as a cruise control unit, radio and lights. The optical switch and horn switch comprise the same elements of a light source 1 which emits light, a light detector 2 which senses the quantity of light reaching the light detector and a pathway 3 for the light extending through a void.

Applying force to the cover of the optical switch activates the optical switch by modifying the orientation of the light source or light detector (FIG. 2). Alternatively, the placement of the light source or light detector could be such that deformation causes the devices to come into alignment thereby increasing the signal output. The pliable cover may be translucent, such that at night the light source may illuminate the activation area.

Figure 10:
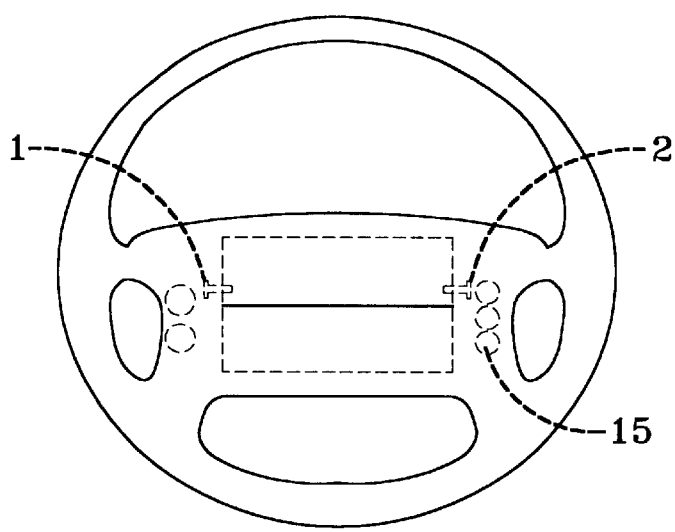
FIG. 10 is a perspective view of a steering wheel with both optical horn switches and optical ancillary switches present.

A steering wheel could have one or more optical ancillary switches (15) activating or controlling many different automotive electronic devices such as but not limited to a light, radio, cruise control, air-conditioning, etc. (FIG. 10). Some of the control operations of the devices mentioned herein are dimming, volume, speed setting, temperature adjustment, airflow modification, etc. The optical switches could be mounted on the rim, spoke, or hub portion of the steering wheel. Also the optical switches can be mounted on the automobile's instrument panel and be used for the activation or controlling of the electronic devices mentioned herein.

The invention has been described with reference to the preferred embodiments. Obviously, modifications and alterations will occur to others upon a reading and understanding of the specification. It is our intention to include all such modifications and alterations insofar as they come within the scope of the appended claims or the equivalents thereof.

We claim:

1. A horn switch for an automobile comprising:
   a steering wheel having a hub;
   an airbag module mounted to the steering wheel hub;
   a flexible cover mounted to the steering wheel hub and overlying the airbag module;
   a light source mounted to the flexible cover;
   a light detector mounted to the flexible cover and spaced from the light source, and in light receiving relation to the light source;
   a controller for detecting variation in the light transmitted from the light source to the light detector, and activating the horn of the automobile in response to variations in said transmitted light, said variations being caused by flexing of the cover, wherein the light traveling from the light source to the light detector propagates through empty space and not through an optically conductive material capable of detecting the deformation of its medium.

2. The horn switch according to claim 1 wherein the light comprises light in the visible range.

3. The horn switch according to claim 1 wherein the light comprises light in the infrared range.

4. The horn switch according to claim 1 wherein the emitted light is reflected off of a surface before reaching the light detector.

5. The horn switch of claim 1, wherein the flexing of the cover at least partly obstructs the light receiving relation between the light source and the light detector.

6. The horn switch of claim 1, wherein the flexing of the cover causes motion of the light detector so as to decrease the intensity of the transmitted light measured by the light detector.

7. The horn switch of claim 1, wherein the flexing of the cover causes motion of the light source so as to decrease the intensity of the transmitted light measured by the light detector.

8. A horn switch for an automobile comprising:
   a steering wheel having a hub;
   an airbag module mounted to the steering wheel hub;
   a flexible cover mounted to the steering wheel hub and overlying the airbag module to create a void between the flexible cover and the airbag module;

a light source mounted to project light across the void;

a light detector mounted spaced from the light source, and in light receiving relation to the light source;

a controller for detecting variation in the light transmitted from the light source to the light detector and activating the horn of the automobile in response to variations in said transmitted light, said variations being caused by flexing of the cover, wherein the light traveling from the light source to the light detector propagates through the void and not through an optically conductive material capable of detecting the deformation of its medium.

9. The horn switch according to claim 8 wherein the light comprises light in the visible range.

10. The horn switch according to claim 8 wherein the light comprises light in the infrared range.

11. The horn switch according to claim 8 wherein the emitted light is reflected off of a surface before reaching the light detector.

12. The horn switch of claim 8 wherein the flexing of the cover at least partly obstructs the light receiving relation between the light source and the light detector.

13. The horn switch of claim 8 wherein the flexing of the cover causes motion of the light detector so as to decrease the intensity of the transmitted light measured by the light detector.

14. The horn switch of claim 8 wherein the flexing of the cover causes motion of the light source so as to decrease the intensity of the transmitted light measured by the light detector.

* * * * *